3,035,044
STREPTOMYCIN ISONICOTINOYLHYDRAZONE
Harry Louis Yale and Jack Bernstein, New Brunswick, N.J., assignors to Olin Mathieson Chemical Corporation, New York, N.Y., a corporation of Virginia
No Drawing. Filed May 4, 1956, Ser. No. 582,631
4 Claims. (Cl. 260—210)

This application is a continuation-in-part of our parent application, Serial No. 274,506, filed March 1, 1952, now abandoned.

This invention relates to antimycobacterial, especially antituberculous agents.

The development of agents for the treatment of tuberculosis has received extensive consideration for some time. Thus far, the most widely used have been streptomycin and dihydrostreptomycin. However, their utility has been limited, especially where prolonged treatment is required, or where there is impairment of kidney function. Auditory damage has also been found to result from their use. Furthermore, they suffer from the disadvantage that certain strains of the pathogen *Mycobacterium tuberculosis* become resistant to streptomycin therapy, so that such cases of tuberculosis cannot be effectively treated with these known agents.

It is the object of this invention to provide a class of relatively nontoxic antimycobacterial, especially antituberculous, agents which are highly efficacious when administered parenterally or perorally and which are nonrestricted in their effect on *Mycobacterium tuberculosis*.

This object is achieved by the agents of this invention, which comprise the streptomycin hydrazone of isonicotinic acid hydrazide and the salts thereof, particularly the mineral acid salts, which we have found are not only highly active tuberculostatic agents, but further are equally effective in the treatment of streptomycin (and dihydrostreptomycin) resistant and isonicotinic acid hydrazide resistant strains of microorganisms. This was unexpected, in that it was known that when streptomycin is reacted with other hydrazides or hydrazines, the streptomycin moiety is deactivated.

The hydrazones of this invention may be prepared by reacting streptomycin (either as the free base, or in the form of its acid addition salt) with isonicotinic acid hydrazide. Wide latitude is permissible with respect to reaction conditions. Thus, in preparing the hydrazone, the proportions of the reactants may be altered, though equimolecular proportions are preferred; and the reaction time may be shortened by raising the temperature and operating preferably in the pH 3 to 7 range. Although water is the most desirable reaction medium, other solvents, such as the lower alkanols, dioxane, the cellosolves and dimethylformamide may be used.

When a streptomycin acid-addition salt is used as reactant, the reaction product is normally obtained in its acid-addition salt form. The corresponding free base, if desired, may be liberated from such salt (e.g., the hydrochloride) by treatment with conventional reagents (e.g., silver oxide) or by passage through a suitable anion exchanger. The free base may also be obtained directly by using a streptomycin in base form as reactant; and such base may then be converted to an acid-addition salt by conventional methods. Thus, acid-addition salts with mineral acids may be prepared in aqueous solution or under anhydrous conditions, for example, by passing hydrogen chloride gas into a solution of the hydrazone base in an appropriate solvent. Salts of other acids, such as sulfuric, phosphoric, p-aminosalicylic, p-toluenesulfonic, $N^1$-benzoylsulfanilamide, methionine, $N^1$-acetylsulfanilamide, sulfamic, lactic, citric and gluconic acids may be prepared. Double salts may also be prepared. Thus, the hydrochloride form of the reaction products may be treated with calcium chloride to yield hydrochloride-calcium chloride double salts. The preferred salts, however, are those of mineral acids, as exemplified by the hydrochloric and sulfuric acid salts.

The compounds of this invention may be used perorally or parenterally as chemotherapeutic agents for tuberculosis, or may be employed as environmental antituberculous agents, especially in hospitals and dairies. Thus, for peroral administration, the compounds of this invention may be embodied in various pharmaceutical formulations, which term, as used herein, includes dosage-unit formulations as well as subdivisible formulations of the compound in a suitable vehicle or carrier (e.g., elixirs, suspensions, distilled-water solutions and saline solutions). Preferred are the dosage-unit formulations, as capsules and tablets. These may be prepared in the conventional manner. Thus, capsules may be made containing a composition of a compound (or mixture) of this invention with starch (or other suitable excipient) in appropriate proportion. Also, one-piece gelatin capsules may be prepared containing the desired dosage in sufficient corn oil to render the compound (or mixture) capsulatable. Tablets may be prepared to contain desired quantities of a compound (or mixture) of this invention using starch, for example, as excipient; and they may be scored to enable administration of fractional dosages.

Therapeutic dosages of the compounds of this invention are readily determinable, peroral administration of the isonicotinoyl hydrazone of streptomycin in a dosage of the order of 20–40 mg./kg./day and parenteral administration in a dosage of the order of 2–10 mg./kg./day being therapeutically effective.

In sterile aqueous solution, or in physiological saline solution, the compounds of this invention may be used parenterally, as by intrathecal or intramuscular injection, or instilled into empyema cavities, large lung cavities, or draining fistulae.

The compounds of this invention may also be used as environmental antituberculous agents by dissolving them in a suitable solvent for use as a spray composition, or dissolving them in compatible detergent solutions for use in cleansing.

Following are specific examples illustrative of the invention:

EXAMPLE 1

*Streptomycin Isonicotinoylhydrazone*

A solution of 5.5 g. isonicotinic acid hydrazide and 27.7 g. streptomycin trihydrochloride in 200 ml. water is allowed to remain at room temperature for 12–16 hours to obtain maximum yield (reaction being substantially complete in 3 hours), clarified by filtration, then freeze-dried to yield about 30.7 g. of the hydrazone hydrochloride (M.P. 202–204° $C_{.dec}$).

[Treatment of the hydrazone hydrochloride with silver oxide yields the free base, streptomycin isonicotinoylhydrazone.]

EXAMPLE 2

*Streptomycin Isonicotinoylhydrazone Sulfate*

By substituting 29.1 g. of streptomycin sulfate for the streptomycin trihydrochloride in the procedure of Example 1, streptomycin isonicotinoylhydrazone sulfate is obtained.

The invention may be variously otherwise embodied within the scope of the appended claims.

We claim:

1. A member of the group consisting of streptomycin isonicotinoylhydrazone and acid-addition salts thereof.
2. A mineral acid addition salt of streptomycin isonicotinoylhydrazone.
3. A hydrochloric acid-addition salt of streptomycin isonicotinoylhydrazone.
4. A sulfuric acid-addition salt of streptomycin isonicotinoylhydrazone.

References Cited in the file of this patent

UNITED STATES PATENTS

| | | |
|---|---|---|
| 2,596,069 | Fox | May 6, 1952 |
| 2,620,336 | Winnek | Dec. 2, 1952 |
| 2,634,264 | Winsten et al. | Apr. 7, 1953 |
| 2,646,427 | Patelski et al. | July 21, 1953 |

OTHER REFERENCES

Monatshefte für Chemie, vol. 33 (1912), pages 401–402.

Donovick et al.: Journ. Biol. Chem. vol. 164, page 173 (1946).

Ziering & Buck: "Furans; a new class of trypanocidal agents," Jubilee vol., E. Barell, Basel, June 27, 1946, page 378.

Youmans et al.: Journ. Bacteriology, vol. 54, pages 415–416 (1947).

Sexton, W. A.: "Chemical Constitution & Biological Activity," Spon. Ltd., London, 1949, pages 95–96.

Lesser: "New Drugs for Tuberculosis," Drugs & Cosmetic Industry, June 1950, vol. 66, No. 6, pages 658–659, 744–745, 748–752.

D. Libetmann: Compt. rend. 243, 107 (1952).